(12) United States Patent
Cutting (10) Patent No.: US 9,808,780 B2
(45) Date of Patent: Nov. 7, 2017

(54) SYSTEM, CONTAINER, DEVICE, AND METHOD FOR MIXING

(71) Applicant: Sartorius Stedim North America Inc., Bohemia, NY (US)

(72) Inventor: Jonathan Cutting, East Setauket, NY (US)

(73) Assignee: SARTORIUS STEDIM NORTH AMERICA INC., Bohemia, NY (US)

( * ) Notice: Subject to any disclaimer, the term of this patent is extended or adjusted under 35 U.S.C. 154(b) by 682 days.

(21) Appl. No.: 14/221,801

(22) Filed: Mar. 21, 2014

(65) Prior Publication Data

US 2015/0265986 A1    Sep. 24, 2015

(51) Int. Cl.
| | | |
|---|---|---|
| B01F 11/00 | (2006.01) | |
| B01F 7/00 | (2006.01) | |
| B01F 15/00 | (2006.01) | |
| B01F 13/00 | (2006.01) | |
| B01F 7/16 | (2006.01) | |
| B01F 7/18 | (2006.01) | |
| F16J 15/52 | (2006.01) | |

(52) U.S. Cl.
CPC ...... *B01F 15/0048* (2013.01); *B01F 7/00458* (2013.01); *B01F 7/162* (2013.01); *B01F 7/1625* (2013.01); *B01F 7/18* (2013.01); *B01F 11/0028* (2013.01); *B01F 11/0088* (2013.01); *B01F 11/0091* (2013.01); *B01F 13/003* (2013.01); *B01F 15/0085* (2013.01); *B01F 15/00662* (2013.01); *F16J 15/525* (2013.01); *B01F 2015/0011* (2013.01); *B01F 2015/00649* (2013.01); *B01F 2215/0073* (2013.01)

(58) Field of Classification Search
CPC ............... B01F 11/04; B01F 15/00675; B01F 15/0085; B01F 7/00666; B01F 7/00725; B01F 11/0085; B01F 11/0097; B01F 15/0048; B01F 11/0088
USPC ........ 366/316, 276–278, 207, 208, 314, 315
See application file for complete search history.

(56) References Cited

U.S. PATENT DOCUMENTS

| | | |
|---|---|---|
| 2,472,010 A | 5/1949 | Gilman |
| 3,132,848 A | 5/1964 | Garlinghouse |
| 3,436,058 A | 4/1969 | Murphy |
| 3,636,753 A | 1/1972 | Thiele et al. |
| 4,112,518 A | 9/1978 | Garlinghouse |

(Continued)

FOREIGN PATENT DOCUMENTS

| | | |
|---|---|---|
| DE | 100 25 381 | 12/2001 |
| DE | 10 2005 020 460 | 11/2006 |
| FR | 874960 | 9/1942 |

OTHER PUBLICATIONS

International Search Report and Written Opinion of International Search Authority.

*Primary Examiner* — Tony G SooHoo
*Assistant Examiner* — Anshu Bhatia
(74) *Attorney, Agent, or Firm* — Gerald E. Hespos; Michael J. Porco; Matthew T. Hespos (57) ABSTRACT

A system for mixing content of a container comprises a container includes an interior mixing element, an exterior drive system and a mixing device comprising an exterior bearing for coupling the exterior drive system to the interior mixing element of the container. The exterior bearing provides a driven non-rotating, nutating motion that drives the interior mixing element of the container so that it performs a mixing motion inside the container.

11 Claims, 4 Drawing Sheets

(56) References Cited

U.S. PATENT DOCUMENTS

| | | | |
|---|---|---|---|
| 7,648,095 B2 | 1/2010 | Jaegle | |
| 2002/0172092 A1* | 11/2002 | Reeder | B01F 7/1655 |
| | | | 366/270 |
| 2006/0233044 A1* | 10/2006 | Freeman | B01F 7/26 |
| | | | 366/316 |
| 2010/0015696 A1* | 1/2010 | Claes | B01F 3/04269 |
| | | | 435/303.3 |
| 2010/0149907 A1* | 6/2010 | Watkins | B01F 7/00675 |
| | | | 366/210 |

* cited by examiner

FIG. 6D

SYSTEM, CONTAINER, DEVICE, AND METHOD FOR MIXING

BACKGROUND

1. Field of the Invention

A rotating impeller is used as for mixing the contents of a container. The content of the container may be a fluid for bioprocessing.

2. Description of the Related Art

A conventional impeller is driven by a rotating shaft passing through the container wall. The rotating shaft is driven by a motor arranged outside of the container. A seal is used to prevent passage of fluid between the rotating shaft and the container wall. Leaks are problematic as they may result in contamination of the container contents and/or may release container contents into the environment. Complicated designs for such seals have been generated to address this problem. Such a conventional mixing device is known from document DE 10 2005 020 460 A1.

To maintain the integrity of the container, magnetic couplings have been proposed that transmit a mixing motion into the container by a magnetic coupling. Such a conventional mixing device is known from document DE 100 25 381 A1.

It is a problem to mix the contents of a container in a way that reduces the risk of contamination of the container contents and/or that reduces a leakage of the container contents and/or in that the container is produced at a reasonable cost, e.g., as a single-use product.

SUMMARY OF THE INVENTION

One aspect of the invention relates to a system for mixing the contents of a container. The system comprises a container with an interior mixing element and a mixing device with an exterior bearing for coupling an exterior drive system to the interior mixing element of the container.

The exterior bearing provides a driven non-rotating, nutating motion that drives the interior mixing element of the container so that it performs a mixing motion inside the container. The container may be provided as a closed container and, thus, may remain unpunctured and unopened, maintaining the sterility of containers that are provided to the user in a presterilized fashion. The container may remain sealed during the mixing of the container contents and may be provided with one or more access ports which allow filling or emptying the container. The container may be sealed so that no fluid may pass from the inside of the container to the outside of the container or vice versa, wherein the seal itself may be non-rotating and may not be in contact with a rotating shaft. The closed container may be implemented as a hermetically sealed container that remains hermetically sealed during the mixing process.

The exterior drive system may be implemented as part of the mixing device or as a separate device.

The invention also relates to a container for mixing the contents of the container. The container comprises an interior mixing element and an exterior drive system. The interior mixing element is adapted and configured to be coupled to the exterior drive system by means of an exterior bearing provided outside of the container. The interior mixing element is adapted and configured to perform a mixing motion inside the container when driven by a non-rotating, nutating motion provided by the exterior bearing.

The container may be a closed container, particularly a container of a system according to the first aspect.

The invention also relates to a mixing device for mixing the contents of a container with an interior mixing element. The mixing device comprises an exterior bearing for coupling an exterior drive system to said interior mixing element of the container. The exterior bearing provides a driven non-rotating, nutating motion that drives the interior mixing element of the container so that it performs a mixing motion inside the container. The device may be a mixing device of the above-described system.

The invention further relates to a method for mixing the contents of a container. The method comprises the steps providing the container comprising an interior mixing element, providing an exterior bearing as a bearing for the container, coupling an exterior drive system to the interior mixing element of the container by means of the exterior bearing, and providing a non-rotating, nutating motion by the exterior bearing so that the interior mixing element of the container performs a mixing motion inside the container.

The above-described system may be used according to this method to mix contents of a container.

DETAILED DESCRIPTION OF THE PREFERRED EMBODIMENTS

Embodiments of the present invention relate to a system for mixing the contents of a container, comprising a container with an interior mixing element, an exterior drive system and a mixing device. The system further comprises an exterior bearing for coupling the exterior drive system to the interior mixing element of the container. Therein, the exterior bearing provides a driven non-rotating, nutating motion that drives the interior mixing element of the container so that it performs a mixing motion inside the closed container, particularly without opening the container.

Figure 1:
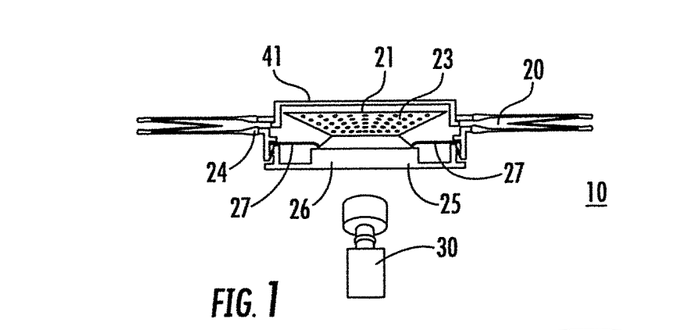
FIG. 1 shows a schematic drawing of an exemplary empty container with an exemplary mixing device.

FIG. 1 shows an exemplary system 10 for mixing the contents of a container 20 that may be coupled to an exterior drive system 30. The container 20 may be a container holding fluids used in bioprocessing and may be implemented as a plastic bag and/or bag assembly. The container 20 may be implemented as a single-use container or as a reusable container.

FIG. 1 shows the system 10 in a state wherein the container 20 is not yet coupled to the exterior drive system 30. The exterior drive system 30 itself may be driven by a motor, e.g. an electric motor, an air driven motor, etc. (not shown), which induces the exterior drive system 30 to perform a nutating motion. Furthermore, the container 20 is not yet filled by any contents (except some air) and is, therefore, folded up. The container 20 comprises a wall 24 which may at least in parts be made of flexible plastic. Some other part or parts of the container wall 24 may be provided as an inflexible material. The container wall 24 surrounds the container 20 and may define its borders.

At one portion of the container wall 24, in the exemplary embodiment shown in FIG. 1 at a portion located at the bottom of the container 20, a connection portion 25 is arranged. The connection portion 25 comprises in its center a stiff portion 26 that is provided as an inflexible material. The stiff portion 26 has substantially the shape of a flat disc. At the perimeter surrounding the disc of the stiff portion 26, the connection portion 25 comprises a flexible portion 27. The flexible portion 27 may be implemented as a substantially circular seal surrounding the stiff portion 26.

Coupled and/or connected to the connection portion 25, the container 20 comprises an interior mixing element 21. The interior mixing element 21 is implemented as a mixing element that forms a part of the container. The interior mixing element 21 protrudes from the container wall 24 into the interior of the container 20.

In the exemplary embodiment shown in FIG. 1, the interior mixing element 21 is implemented as a disc 23. The interior mixing element 21 is connected to the flexible portion 27 in a sealing manner. The flexible portion 27 seals the interior mixing element 21 at the wall of the container 20 in a way that the container 20 remains closed even if the interior mixing element 21 performs a mixing motion. The sealing function of the flexible portion 27 may be of a quality that it seals the container impermeably and/or watertight and/or airtight.

The interior mixing element 21 is further connected to the stiff portion 26 of the connecting portion 25. However, the connection between the interior mixing element 21 and the stiff portion 26 allows a movement of the two portions relative to each other.

The container 20 may comprise a reclosable opening 41 by which the contents may be filled into the container 20.

Figure 2:
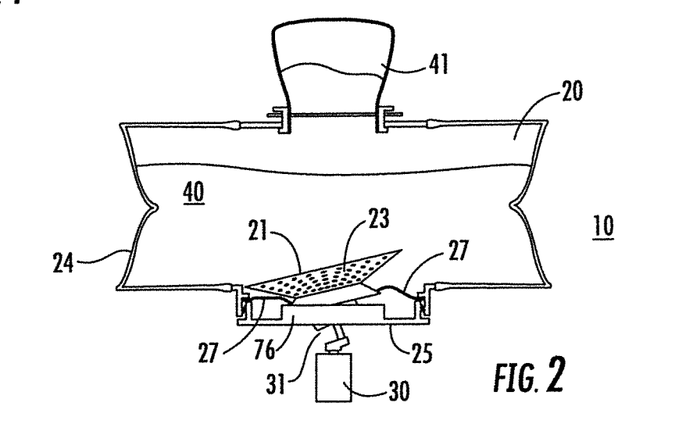
FIG. 2 shows a schematic drawing of an exemplary embodiment of a system comprising a closed container and a mixing device.

FIG. 2 shows the container 20 and the exterior drive system 30 shown in FIG. 1 in a state wherein they are both coupled to each other. Furthermore, the container 20 is at least partially filled by a fluid as its content 40. The fluid may have been filled into the container 20 through the reclosable opening 41. When coupled, the container 20 may be fixed to the exterior drive system 30 by a force-fit, by a form-fit, a snap-fit, and/or by an adhesive bond. In an embodiment, the container 20 may be screwed to the exterior drive system 30. Therein, the container and/or the exterior bearing of the exterior drive system 30 may comprise screwing means adapted to be screwed together.

The container 20 is coupled to the exterior drive system 30 without opening the closed container and without compromising the sterility of the container provided to the user in a presterilized fashion. The exterior drive system 30 comprises an exterior bearing to which the connection portion 25 of the container 20 is coupled. The coupling between the container 20 and the exterior drive system 30 may have one or more of the following properties: When coupled, the container 20 may rest on the exterior bearing of the exterior drive system 30. The exterior drive system 30 may comprise a static portion to which the container 20 is fixed when coupled to the exterior bearing. In particular, the stiff portion 26 of the connecting portion 25 may be fixed relative to the static portion of the exterior drive system 30. The interior mixing element 21 may be coupled to a nutating element of the exterior drive system 30, wherein the nutating element performs a non-rotating, nutating motion, as it precesses about its main axis, for example a bobbing, nodding-up-and-down or wobbling motion. The interior mixing element 21 may at least be partially fixed relative to the nutating element of the exterior drive system 30. This means that when the nutating element of the exterior bearing 31 is moving in a wobbling motion, the interior mixing element 21 will at least partially perform the same wobbling motion as the nutating element of the exterior bearing 31. Since the rest of the container 20, in particular most of the container wall 24 and the stiff portion 26 of the connection portion, is fixed in a static position, the interior mixing element 21 will perform a mixing motion relative to the container walls 24, thereby mixing the content 40 of the container 20. Therein, the flexible portion 27 serves as an absorbing connection between the moving interior mixing element 21 and the static container walls 24 and, e.g., a static portion of the connection portion 25. The flexible portion 27 absorbs the relative movement of the interior mixing element relative to the static portions of the container 20 when coupled to the exterior bearing of the exterior drive system 30.

Figure 3:
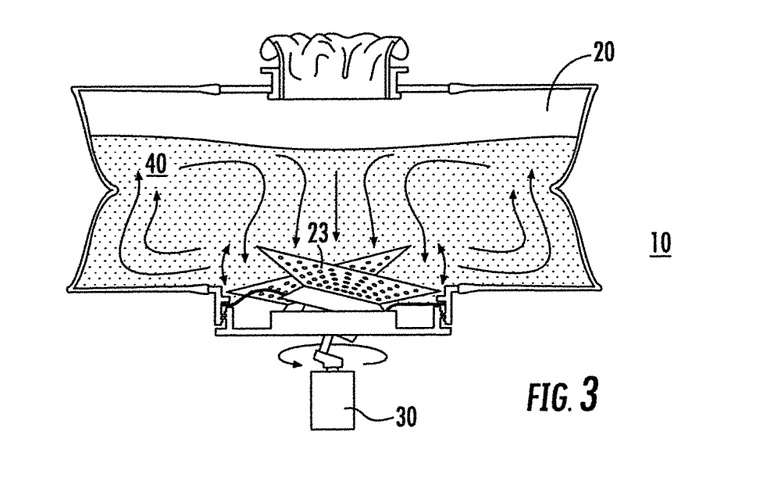
FIG. 3 shows a schematic drawing of an exemplary embodiment of a system comprising a closed container and a mixing device while mixing the contents of the container.

FIG. 3 shows in an exemplary embodiment of how the disc 23 as interior mixing element performs a mixing motion that mixes the content 40 of the container 20 without any punctuation or other violation of the container 20, e.g., by a rotating shaft that is led through the container wall as known from prior-art mixing systems. In particular, the interior mixing element 21 does not perform any rotation that would necessarily require some portion of the wall 24 of the container 20 to rotate against other wall portions of the container 20. The interior mixing element may be implemented as a paddle and perform a paddling motion as its mixing motion. In particular, both the exterior drive system 30 and the container 20 may be implemented magnet-free without any permanent magnet or electromagnet.

Figure 4A:
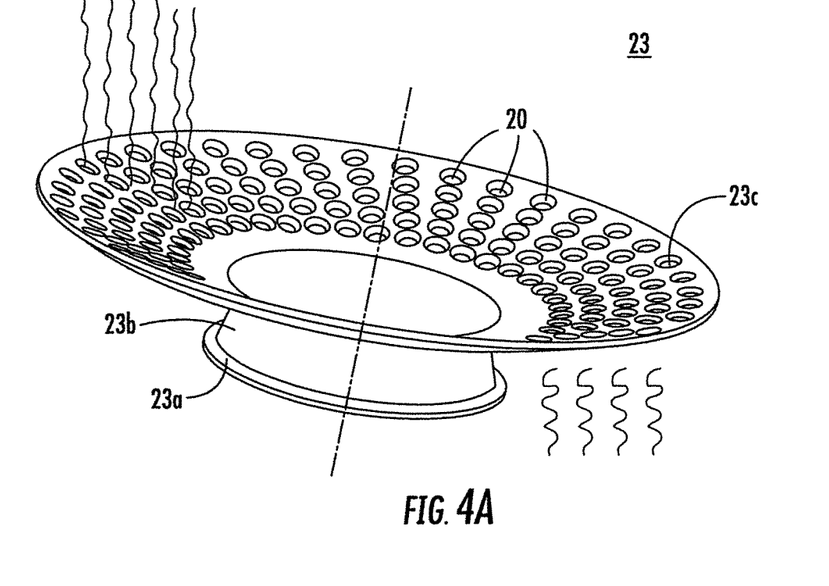
FIG. 4A shows a schematic drawing of an exemplary interior mixing element provided as a disc.

FIG. 4A shows an exemplary interior mixing element implemented as disc 23. The disc 23 comprises multiple tapered orifices 29 which induce a net flow of fluid, thereby promoting mixing of the content of the bag, in particular if the content is provided as a fluid. The disc 23 comprises a base 23a that is fixed relative to the nutating element of the exterior bearing when the container is coupled to it. The base 23a may have the shape of a small first disc. Extending from the base 23a is a spacer 23b holding a disc portion 23c spaced apart from the base 23a. The disc portion 23c, the spacer 23b, and the base 23a are statically fixed relative to each other. The disc portion 23c may be in the shape of a large second disc that may also be shaped as part of a sphere. The disc portion 23c comprises the orifices 29 that may be implemented as tapered orifices.

Figure 4B:
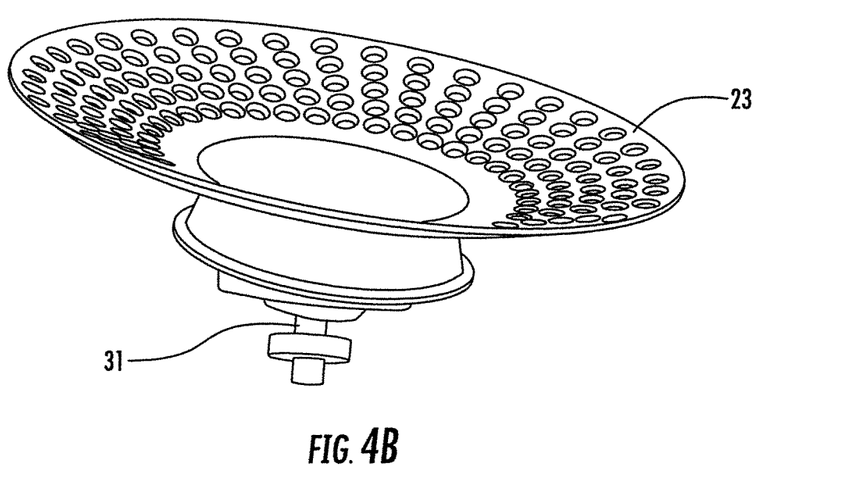
FIG. 4B shows a schematic drawing of the interior mixing element of FIG. 4A coupled to an exterior bearing.

FIG. 4B shows the disc 23 shown in FIG. 4A coupled to an exterior bearing 31. The exterior bearing 31 is exemplary described in further detail in connection with of FIGS. 5 and 6.

Figure 5A:
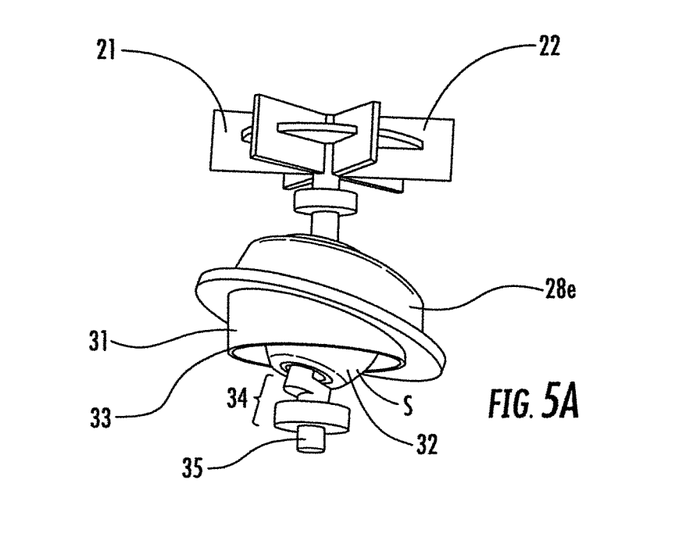
FIG. 5A shows a schematic drawing of an exemplary embodiment of an interior mixing element implemented as an impeller, the interior mixing element being coupled to an exterior bearing.

FIG. 5A shows an exemplary embodiment comprising an interior mixing element 21 implemented as an impeller 22 coupled to an exterior bearing 31 of a mixing device. In FIG. 5A, neither the container 20 itself nor the container walls 24 are shown. However, the interior mixing element 21 may be arranged inside a container 20 as shown in any of the FIG.

1, 2, or 3. Contrary to the embodiment shown in these figures, in this embodiment, the interior mixing element 21 is not implemented as a disc but as an impeller.

The exterior bearing 31 may be part of an exterior drive system 30 which is not shown in its entirety in FIG. 5A. The exterior bearing 31 is arranged outside of the container, while the interior mixing element 21 is arranged inside the container (not shown in FIG. 5A). The exterior bearing 31 may comprise a rotating shaft 35 that may be driven by the exterior drive system 30 (not shown in FIG. 5A), for example a rotating motor, e.g. an electric motor, an air driven motor, etc. The rotating shaft 35 is able to transmit a torque supplied by the exterior drive system. While the shaft 35 is fixed in its position, it may perform a rotating motion. The rotating shaft 35 ends in an exterior converter 34 that converts the rotating motion of the rotating shaft 35 into a non-rotating, nutating motion of a nutating element 32.

The nutating element 32 is implemented as part of the exterior bearing 31 and, thus, as part of the mixing device. The nutating element 32 is at least partially shaped like a sphere and guided in a static socket 33. The static socket 33 forms a sleeve around parts of the nutating element 32. The nutating element 32 may perform its nutating, in particular wobbling, motion within the static socket 33. The static socket is provided as a static portion of the mixing device 30.

The same mixing device may be used to mix the content of different containers 20, in particular for containers that comprise different interior mixing elements 21, e.g. discs (see FIGS. 1, 2, 3, and 4) and impellers (see FIGS. 5 and 6).

Statically fixed to the nutating element 32 is a connector 28e of an interior converter 28. The interior converter 28 converts the non-rotating, nutating motion provided by the nutating element 32 into a rotating motion driving the impeller 22. Thus, the interior impeller 22 may perform a rotating motion as mixing motion inside the closed container. The interior converter 28 and the connector 28e are implemented as part of the container 20. The connector 28e is arranged at the wall of the container 20.

The rotating motion provided by the exterior rotating shaft 35 is converted into a non-rotating, nutating motion of the nutating element 32. This non-rotating, nutating motion is transferred to the connector 28e at the wall of the container 20. Then, the non-rotating, nutating motion of the connector 28e is converted back into a rotating motion of the impeller 22 within the closed container. Thus, a rotating motion may be provided inside a closed container without penetrating the container itself, which preserves the sterility of the container if provided in presterilized fashion to the end user. The connector 28e provided at the container wall 24 remains fixed relative to the nutating element 32 of the exterior bearing 31 while the container 20 is coupled to the exterior bearing 31. A nutation coupling, in particular a wobbling coupling is, thus, provided.

Figure 5B:
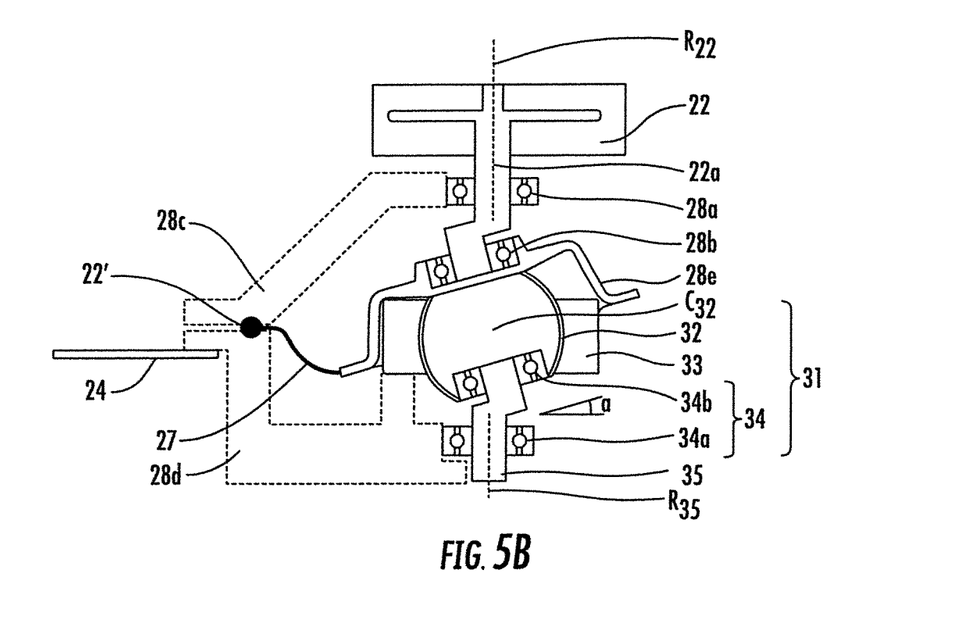
FIG. 5B shows a schematic drawing of a cross-section of the interior mixing element together with the exterior bearing shown in FIG. 5A.

FIG. 5B shows a cross-section of the impeller 22 and the exterior bearing 31 shown in FIG. 5A. The rotating shaft 35 as part of the exterior drive system (not shown) rotates about its axis of rotation R35. The rotating shaft 35 is guided and held in position by a fixed exterior bearing 34a. The fixed exterior bearing 34a is part of an exterior converter 34 which converts the rotating motion of the rotating shaft 35 into a non-rotating, nutating motion, in particular a wobbling motion. The fixed exterior bearing 34a stabilizes the axis of rotation R35.

The container-sided end of the rotating shaft 35 comprises an angled section with an offset angle α which establishes a nutating motion, for example a bobbing, nodding-up-and-down or wobbling motion about a center point, as the nutating element 32 precesses about its main axis. The offset angle α may be between 5° and 50°, in particular between 10° and 30°. A nutation coupling as provided in the embodiment shown in FIGS. 5A and 5B may transmit torque without rotation, thereby eliminating the need for a rotation shaft seal at the transmission from the exterior of the container to the interior of the container. The rotating shaft 35 interfaces with a moving part of the nutating element 32 which may provide a nutation bearing. For this, the exterior converter 34 comprises an exterior isolation bearing 34b which prevents the nutating element 32 from rotating.

The connector 28e of the interior converter 28 may be implemented as a cover at the interior of container 20 and coupled to the nutating element 32. The connector 28e isolates the interior of the container 20 from the exterior of the container and provides a parameter sealing surface for flexible portion 27.

The flexible portion 27 may be implemented as a diaphragm seal comprising an O-ring 27'. Its sealing surface may be coplanar with a center of nutation C32 of the nutating element 32 so that a radial movement of the coupled elements is minimized. The impeller 22 comprises an impeller shaft 22a which interfaces with the connector 28e by an interior isolation bearing 28b. The interior isolation bearing 28b is implemented as part of the interior converter 28.

The impeller shaft 22a rotates about its axis of rotation R22. This axis of rotation R22 is stabilized by a fixed interior bearing 28a implemented as an impeller shaft main bearing. The fixed interior bearing 28a may be part of the interior converter 28. The fixed interior bearing 28a is held into position by an interior housing 28c which is held in a position fixed relative to an exterior housing 28d. The interior housing 28c and the exterior housing 28d may be implemented as part of the connection portion 25 (see FIGS. 1 and 2). Furthermore, the interior housing 28c and exterior housing 28d may be part of the interior converter 28 and, as such, be part of the container 20 itself. The container wall 24 may be fixed to the exterior housing 28d. Between the interior housing 28c and the exterior housing 28d the flexible portion 27 is fixed in a sealed manner.

The impeller 22 may be implemented as any type of rotating impeller supplemented by an interior converter 28. The interior housing 28c and the exterior housing 28d secure fixed components of the container 20 and encapsulate flexible portion 27 in a package convenient for welding into the container wall 24. Such a package my comprise the connection portion 25 and the interior mixing element 21 and be welded into the wall of any container, e.g. into the wall of a plastic bag. Welded into the container wall, the package will replace a portion of the wall. The flexible portion 27 implemented as a diaphragm comprises an integral perimeter that is squeezed between the interior and the exterior housings 28c and 28d, thereby providing a robust seal. The diaphragm is structured such that it can withstand the nutation motion of the nutating element 32.

FIGS. 6A to 6D show the nutation coupling provided by an exemplary system in four different positions of rotation. The axis of rotation of the rotating shaft 35 and the impeller shaft 22a remain parallel to each other; in particular, they substantially fall on top of each other. Both shafts are held in position by the fixed interior bearing 28a and the fixed exterior bearing 34a, respectively. Those two bearings allow, however, a rotating motion of the respective shafts. The nutating element 32 is fixed to the connector 28e of container 20. Connector 28e is implemented as a cover at least partially receiving the nutating element 32. Connector 28e and the nutating element 32 remain in a position fixed relative to each other throughout the nutating, in particular motion.

While the nutating element 32 itself is not rotating about its own axis, but performs a rocking, swaying, bobbing, nodding-up-and-down or wobbling motion, as it precesses about its main axis, it may be driven by a rotating shaft that defines the axis of rotation in which the nutating element is rocking, swaying, and/or nodding. The nutating element is arranged in a position that is tilted with respect to the axis of rotation R35 of the rotating shaft 35. The tilt-alignment of the nutating element is changing during its nutating motion. The tilt-alignment of the nutating element 32 is rotating about to the axis of rotation R35 of the rotating shaft 35. The tilt-angle may be from 5° to 50°, in particular from 10° to 30°.

Figure 6A:
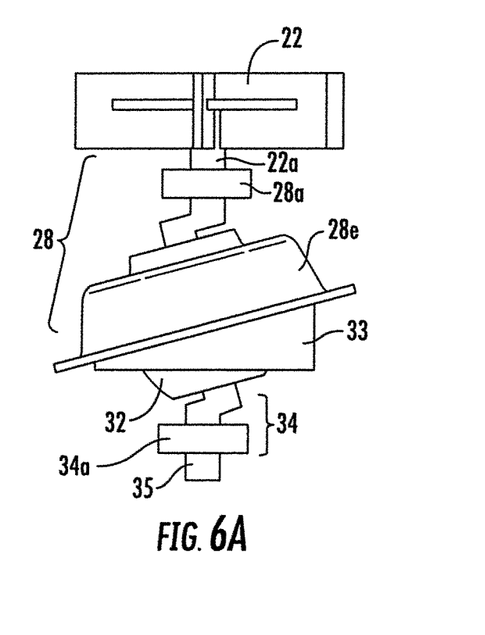
FIGS. 6A to 6D show schematic drawings of an exemplary mixing motion of the interior mixing element shown in FIGS. 5A and 5B coupled to and provided on an exterior bearing.

FIG. 6A shows a position of the system at an angle of 0°. FIG. 6A shows in particular the position of the connector 28e and the nutating element 32 at an angle of 0°.

Figure 6B:
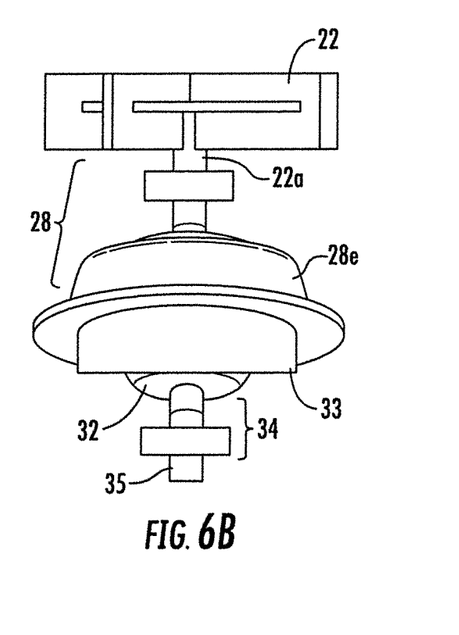

FIG. 6B shows the system of FIG. 6A after the rotating shaft 35 has performed a rotating motion about an angle of 90°. The static socket 33 remains in a position guiding the wobbling motion of the nutating element 32 and, thereby, the wobbling motion of the connector 28e.

Figure 6C:
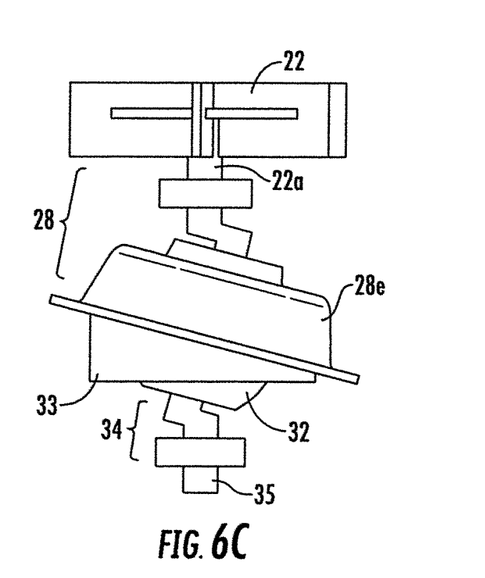

FIG. 6C shows the same system after performing a rotation about a total angle of about 180°. The depicted position is symmetric to the position depicted in FIG. 6A.

Figure 6D:
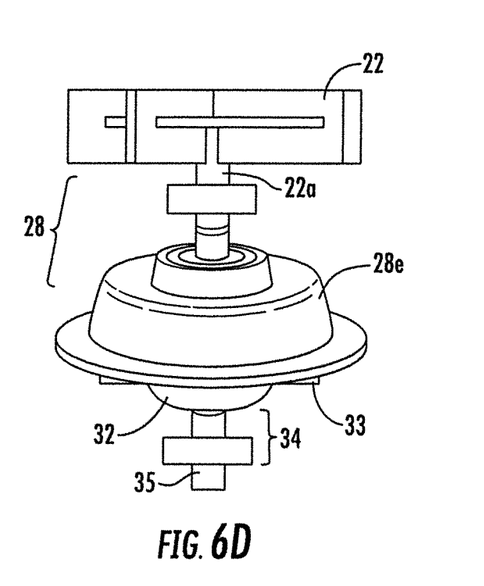

FIG. 6D shows the system after performing a rotation of 270°. After a rotation about an angle of 360°, the system will be in the position shown in FIG. 6A again to repeat the motion.

The system may provide a robust and simple sealing with zero leakage of the content of the container. Furthermore, all elements and parts of the container may be provided at low cost and, thus, may be used in a single-use container.

The system may provide a mechanism for transmitting the torque of a rotating shaft through a wall of a container comprising robust means of sealing. A rotating shaft is a standard technique provided by conventional motors. The system may be used in bioprocessing where it may be critical to avoid ingress of microorganisms.

A rotating input shaft that is part of an exterior drive system driven by a motor may drive a nutating member via an angled section and an isolation bearing. The nutating member drives an output shaft via a second angle section and a second isolation bearing. The angle section of the input shaft is arranged at the same angle as the angled section of the output shaft. The nutating member is not rotating and, thereby, only performing a nutating motion. Therefore, the container may remain sealed comprising a flexible elastomeric diaphragm.

The interior mixing element may perform a rotating motion inside the container.

The exterior bearing may comprise a nutating element guided in a static socket. The nutating element may perform its nutating motion and, in particular, a wobbling motion guided by the static socket.

The surface of the nutating element may at least partially be shaped like a sphere. Thus, the static socket may be shaped to receive the spherical surface of the nutating element.

The exterior bearing of the system may comprise an exterior converter and the exterior drive system comprises a rotating shaft driven by the exterior drive system, wherein the exterior converter converts the movement of the driven rotating shaft into a bobbing, nodding-up-and down or wobbling motion of the nutating element.

The container may comprise a connection portion for coupling the exterior bearing to the interior mixing element, wherein the interior mixing element is coupled to the connection portion, and wherein the connection portion is provided as part of a wall of the container. The connection portion may be implemented at least partially as a flexible elastomeric diaphragm.

In this embodiment, the connection portion may comprise a stiff portion for coupling the connection portion to the exterior bearing, wherein the stiff portion is fixed relative to the exterior bearing during the mixing of the content of the closed container.

The stiff portion may be arranged inside a flexible portion of the connection portion. The flexible portion may be implemented as an elastomer.

The interior mixing element may be a rotating impeller.

The container may comprise an interior converter which converts the non-rotating, nutating motion provided by the exterior bearing into a rotating motion of the impeller.

The non-rotating, nutating motion of the exterior bearing may be converted directly into a non-rotating, nutating motion of the interior mixing element inside the container. In this embodiment, no interior converter of the container is needed to convert the non-rotating, nutating motion back into a rotating motion. In this embodiment, the non-rotating, nutating motion provided by the exterior bearing may be used directly to mix the contents of the container.

The interior mixing element may be provided as a disc or paddle array which performs a non-rotating, nutating, in particular a bobbing, nodding-up-and-down or wobbling, motion as its mixing motion.

The interior mixing element may comprise orifices, in particular tapered orifices that improve the mixing of the content of the container when the interior mixing element is performing its mixing motion.

The container may be a single-use bag.

In an embodiment of the container for mixing the contents in the container, the interior mixing element may perform either a non-rotating, nutating mixing motion or a rotating mixing motion inside the container.

The method for mixing the contents of the container may include providing the container comprising an interior mixing element, providing an exterior bearing as a bearing for the container, coupling an exterior drive system to the interior mixing element of the container by means of the exterior bearing, and providing a nutating, non-rotating motion by the exterior bearing so that the interior mixing element of the container performs either a non-rotating, nutating motion or a rotating motion inside the container.

LIST OF REFERENCE NUMERALS 10 system
20 container
21 interior mixing element
22 impeller
22a impeller shaft
23 disc
23a base
23b spacer
23c disc portion
24 wall
25 connection portion
26 stiff portion
27 flexible portion
27' O-ring
28 interior converter 28a fixed interior bearing
28b interior isolation bearing
28c interior housing
28d exterior housing
28e connector
29 orifice
30 exterior drive system
31 exterior bearing
32 nutating element
S surface
33 static socket
34 exterior converter
34a fixed exterior bearing
34b exterior isolation bearing
35 rotating shaft
40 content
41 opening
$R_{22}$ axis of rotation of the impeller shaft
$R_{35}$ axis of rotation of the rotating shaft
$C_{32}$ center of nutation
α offset angle

What is claimed is:

1. A mixing system, comprising
a container;
an interior mixing element in the container; and
a mixing device comprising a rigid exterior shaft having a first end section defining a first axis and a second end section defining a second axis aligned to the first end section at an acute angle, the first end section being mounted to an exterior drive that rotates the first end section about the first axis, the second end section being rotatably mounted in an exterior bearing fixed to a wall of the container, an interior shaft having a first end section rotatably mounted in an interior bearing fixed to the wall of the container and aligned at an acute angle to the first axis of the exterior shaft, the interior shaft further having a second end section aligned at an acute angle to the first and section of the interior shaft, the interior mixing element being fixed to the second end section of the interior shaft, wherein the exterior drive rotates the first end section of the exterior shaft about the axis thereof and generates a nutating motion of the interior and exterior bearings, and wherein the nutating motion of the interior bearing causes a rotating motion of the second end of the interior shaft and the mixing element mounted thereto about the axis of the second end section of the interior shaft.

2. The system of claim 1, wherein the exterior bearing comprises a nutating element guided in a static socket.

3. The system of claim 2, wherein the nutating element is at least partially shaped like a sphere.

4. The system of claim 2, wherein the exterior bearing comprises an exterior converter and the exterior drive system comprises a rotating shaft driven by the exterior drive system, wherein the exterior converter converts the movement of the driven rotating shaft into a bobbing, nodding-up-and-down or wobbling motion of the nutating element.

5. The system of claim 1, wherein the interior mixing element is a rotating impeller.

6. The system of claim 5, wherein the container comprises an interior converter which converts the non-rotating, nutating motion provided by the exterior bearing into a rotating motion of the impeller.

7. A mixing system, comprising:
a container having at least one wall section that is flexible;
an exterior bearing mounted to an exterior surface of the container and surrounded by the flexible wall section;
a non-linear external shaft having a first end coupled to a drive device and a second end mounted rotatably to the exterior bearing; and
a frustoconical disc mounted to the interior of the container at a position substantially opposed to the exterior bearing to define an interior mixing element, wherein the drive device generates a non-rotating, nutating motion of the exterior bearing that is converted directly into a non-rotating, nutating motion of the interior mixing element inside the container
so that the interior mixing element performs a bobbing, nodding-up-and-down or wobbling motion as its nutating motion.

8. The system of claim 7, wherein the interior mixing element comprises orifices.

9. A container for mixing the contents of the container, the container comprising: an exterior bearing mounted to an exterior region of the container; an interior bearing mounted to an interior region of the container at a position substantially opposed to the exterior bearing, a non-linear interior shaft having a first end rotatably mounted to the interior bearing and a second end mounted to an interior mixing element, an exterior bearing mounted to an exterior region of the container at a position substantially opposed to the interior bearing; a non-linear exterior shaft having first and second ends, the second end being rotatably mounted to the exterior bearing, wherein the container has a flexible wall outward of the interior and exterior bearings and wherein the first end of the exterior shaft is configured to be coupled to an exterior drive system so that the interior mixing element performs a non-rotating, nutating motion and the interior mixing element further performs a rotating motion inside the container about an axis defined by the second end of the interior shaft.

10. The container of claim 9, wherein the container is provided as a single-use bag.

11. A mixing device for mixing the contents of a container, the mixing device comprising: an exterior bearing mounted to an exterior portion of the container, the container having a flexible wall section surrounding the exterior bearing, a non-linear exterior shaft having opposite first and second ends, the second end of the exterior shaft being rotatably mounter to the exterior bearing, an exterior drive system mounted to the first end of the exterior shaft and rotating the first end of the exterior shaft about an axis of the first end of the exterior shaft, an interior bearing mounted to an interior portion of the container substantially opposed to the exterior bearing, a non-linear interior shaft having a first end mounted rotatably to the interior bearing and a second end having an interior mixing element of the container, wherein the exterior drive system provides a driven non-rotating, nutating motion to the interior mixing element of the container so that the interior mixing element performs a mixing nutating motion inside the container, and wherein the rotatable mounting of the second end of the exterior shaft in the exterior bearing and the rotatable mounting of the first end of the interior shaft in the interior bearing causes the interior mixing element to performs a rotating motion about an axis of the interior shaft inside the container in addition to the nutating motion.

* * * * *